United States Patent [19]
Evensen

[11] Patent Number: 5,772,379
[45] Date of Patent: Jun. 30, 1998

[54] SELF-FILLING STAPLE FASTENER

[76] Inventor: Kenneth Evensen, 1429 Fremont, Bartlett, Ill. 60103

[21] Appl. No.: 652,944

[22] Filed: May 24, 1996

[51] Int. Cl.$^6$ .................................................. F16B 15/08
[52] U.S. Cl. ...................... 411/442; 411/447; 411/903; 411/920
[58] Field of Search .................. 411/442–444, 446–448, 411/450, 542, 908, 920, 930, 82, 258, 902, 903; 144/353; 29/460

[56] References Cited

U.S. PATENT DOCUMENTS

| | | | |
|---|---|---|---|
| 964,226 | 7/1910 | Farrand . | |
| 1,814,502 | 7/1931 | Barwood . | |
| 2,008,086 | 7/1935 | Sorenson | 85/49 |
| 2,037,727 | 4/1936 | LaChapelle | 85/49 |
| 2,429,113 | 10/1947 | Warner | 85/11 |
| 2,439,516 | 4/1948 | Holcomb | 174/159 |
| 2,589,491 | 3/1952 | Goodstein | 411/920 |
| 2,603,121 | 7/1952 | Hallock | 85/11 |
| 2,687,666 | 8/1954 | Chalfont et al. | 85/11 |
| 2,718,485 | 9/1955 | Samuely | 411/903 |
| 2,724,303 | 11/1955 | Holcomb | 411/903 |
| 2,741,939 | 4/1956 | Hallock | 85/23 |
| 2,765,834 | 10/1956 | Poupitch | 151/37 |
| 2,811,073 | 10/1957 | Klopstock | 411/920 |
| 2,927,495 | 3/1960 | Barwood | 85/1 |
| 3,240,101 | 3/1966 | Hallock | 85/23 |
| 3,813,985 | 6/1974 | Perkins | 411/442 |
| 3,894,174 | 7/1975 | Cartun | 411/920 |
| 4,275,813 | 6/1981 | Noiles | 411/442 |
| 4,657,460 | 4/1987 | Bien | 411/542 |
| 4,686,808 | 8/1987 | Triplett | 411/542 |
| 4,826,381 | 5/1989 | Kiriyama | 411/443 |
| 4,964,774 | 10/1990 | Lat | 411/903 |
| 5,193,958 | 3/1993 | Day | 411/82 |

FOREIGN PATENT DOCUMENTS

| | | | |
|---|---|---|---|
| 40000009 | 1/1992 | Japan | 411/442 |

*Primary Examiner*—Steven N. Meyers
*Assistant Examiner*—Gary Estremsky
*Attorney, Agent, or Firm*—Fitch, Even, Tabin & Flannery

[57] ABSTRACT

A staple fastener is provided with filler material disposed between its leg portions for filling a cavity in a substrate, which cavity is formed above a head of the staple when the staple is driven into the substrate. The filler material extrudes from the staple as it is driven into the substrate. In accordance with the preferred method, the staple fasteners are driven into the substrate with a power tool applicator to form the cavity and then a tampering plunger tamps the extruded filler material to conform to the surface of the substrate. In the preferred method, a first plunger is actuated first to drive the staple; and a second tamping plunger at an angle to the first plunger is actuated after the first plunger is retracted to tamp the material into cavity and then to smooth the exterior surface of the filler material to conform to the adjacent surface. Preferably, the first plunger causes the filler material to be driven into an opening for the second plunger; and, after the lower end of the plunger lifts from the head of the staple and exposes the cavity, the second plunger pushes the filler material into the cavity to fill the cavity and tamps the filler material in the cavity.

10 Claims, 5 Drawing Sheets

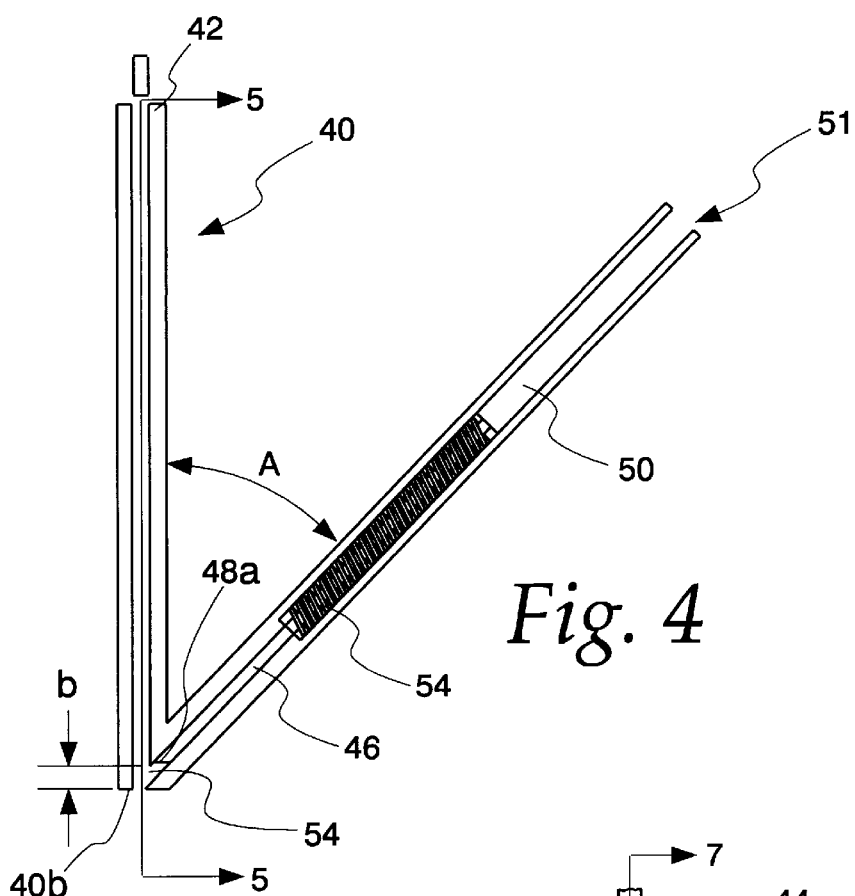
*Fig. 4*
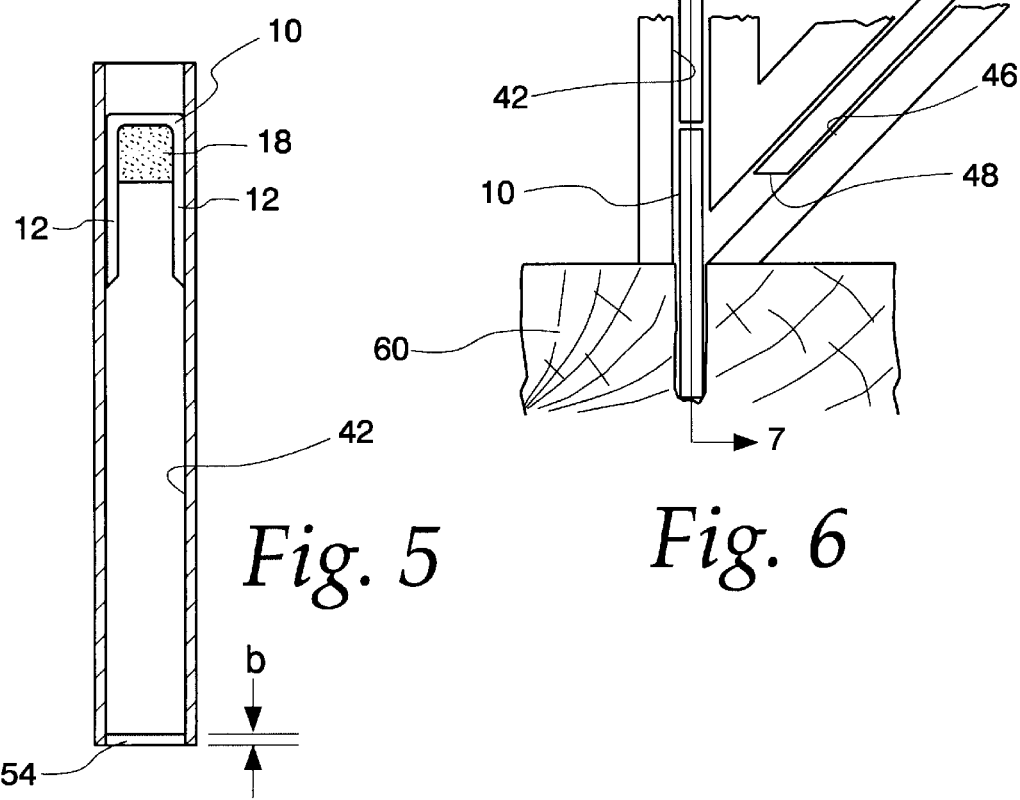
*Fig. 5*   *Fig. 6*

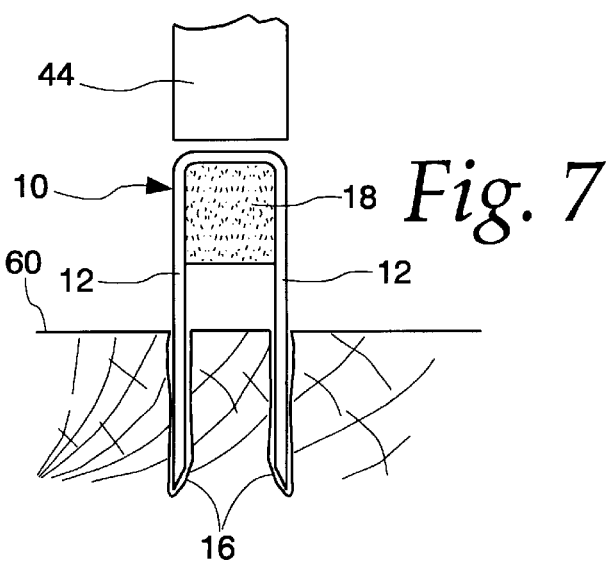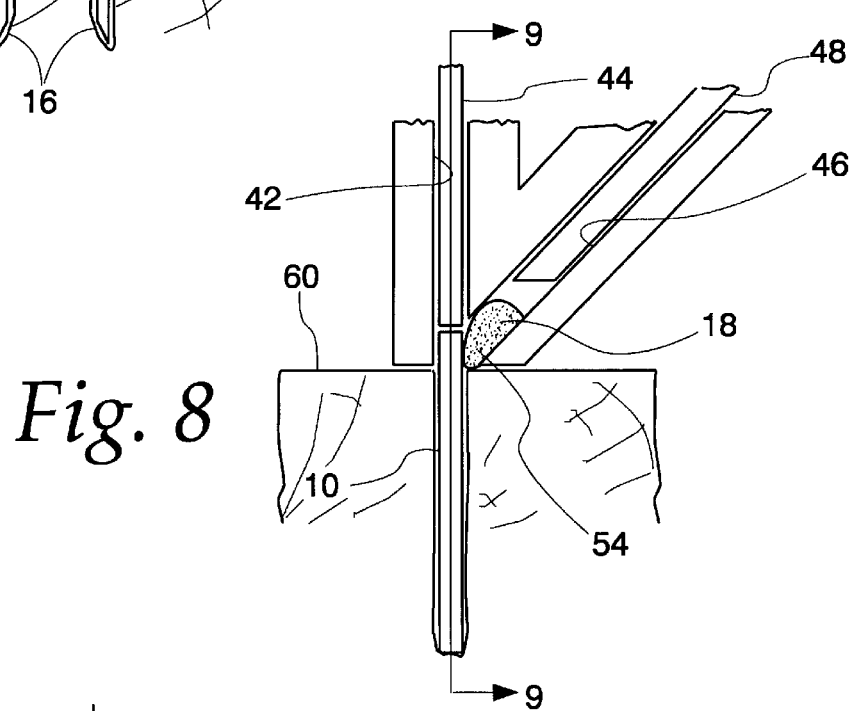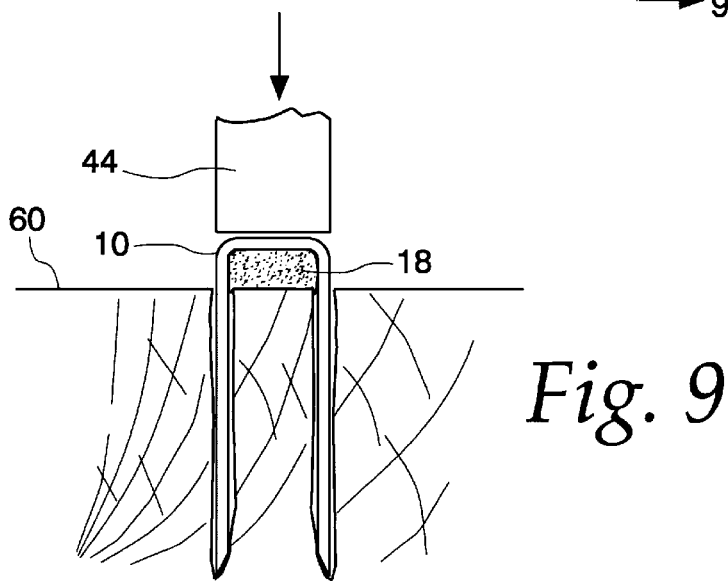

SELF-FILLING STAPLE FASTENER

FIELD OF THE INVENTION OR TECHNICAL FIELD

The present invention relates generally to a staple fastener and to a method of applying the staple to a substrate and applying a filler material to a cavity formed above the staple.

BACKGROUND OF THE INVENTION

When a staple fastener is used for fastening certain substrate materials, such as wood, the staple fastener may be driven below the level of the surface of the substrate and thereby leave a depression or cavity on the surface of the substrate. This happens routinely when a staple fastener is driven into a wood substrate with a powered stapling gun.

It is often desirable to fill the cavity in the substrate with a filler material, such as crayon, wood putty or the like. In a separate operation after driving the staple fastener into the substrate, the cavity is typically filled manually with a filler material. Typically, the filler material is colored, particularly if the substrate is wood, to match substantially the color of the substrate; and the filler material is leveled off to conform to the surface of the substrate to render staple location more or less invisible. It would be desirable to provide a staple fastener and a method of driving a staple fastener into a substrate wherein the cavity in the substrate is automatically filled with a filler material and is automatically leveled off to conform substantially to the substrate surface. Such a staple fastener, and the associated method of use, would provide a substantial savings in time and labor by eliminating the separate operation of manually filling the cavity with filler material and leveling the filler usually by wiping off any excess filler material. Preferably, this could be accomplished with a power-operated tool that drives the staples. Thus, there is a need for a staple and a power tool applicator that automatically fills the cavity above the staple and automatically tamps and levels the filler material so that the staple remains less visible.

SUMMARY OF THE INVENTION

The present invention includes a staple fastener having at least two longitudinally extending leg portions and a filler material associated therewith. The leg portions are interconnected at one end, and are separated to define a space therebetween; and an extrudable filler material is located in, and partially fills, the space between the leg portions. The filler material preferably spans the distance between the leg portions. The staple fastener may be V-shaped, W-shaped, conventional U-shaped, or other shapes. The filler material may be a wax material, crayon material, wood putty material, or other material.

The present invention includes a method of power driving the staple fastener into a substrate and automatically filling the cavity formed above the staple with a filler material. The method includes the step of providing a staple fastener as described above, and driving the staple fastener into a substrate; whereby, as the staple fastener is driven below the level of the surface of the substrate filler material is squeezed into the cavity formed on the surface of the substrate immediately above the staple.

More specifically, as the staple fastener is driven into the substrate, the filler material in the staple fastener is extruded from the space between the leg portions of the staple fastener and is eventually exchanged into the region of the cavity on the surface of the substrate. The filler material is then tamped, preferably by the same tool, whereby the cavity is substantially filled with the filler material, and the filler material generally conforms to the surface of the substrate.

The steps of driving the staple fastener and tamping the filler material may be performed by a unique method employing a stapling gun, which has a first plunger for driving the staple fastener, and a second plunger for tamping the filler material in the cavity to flatten and smooth the filler material much in the manner that was heretofore done manually.

The present invention results in an assembly of the staple fastener, substrate and filler material, whereby the staple fastener has been driven into the substrate, leaving a cavity above the staple fastener, which cavity is filled with a filler material that has been extruded from the staple fastener when the staple fastener was driven into the substrate.

BRIEF DESCRIPTION OF THE DRAWINGS

The invention is described in greater detail in the following description of the preferred embodiment, taken in conjunction with the drawings, in which:

FIG. 4 is a schematic drawing of a staple gun for driving a staple fastener in accordance with the invention;

FIG. 5 is a cross-sectional view of the staple gun and staple fastener taken along the line 5—5 in FIG. 4;

FIG. 6 is a schematic view of a staple fastener and staple gun in accordance with the invention wherein the staple fastener is partially driven into a substrate;

FIG. 7 is a cross-sectional view taken along the line 7—7 in FIG. 6;

FIG. 8 is a schematic view of the staple fastener and staple gun shown in FIG. 6 wherein the staple fastener is driven further into the substrate;

FIG. 9 is a cross-sectional view taken along the line 9—9 in FIG. 8;

DETAILED DESCRIPTION OF THE PREFERRED EMBODIMENT

Figure 1:
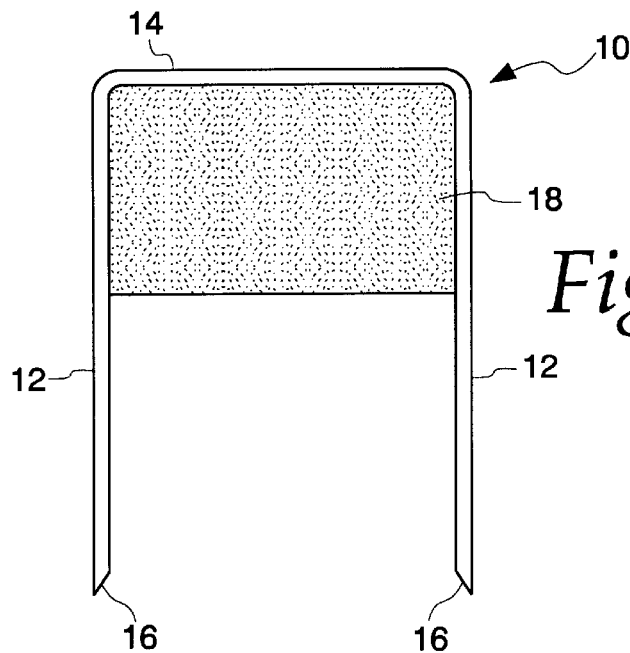
FIG. 1 is a front view of a U-shaped staple fastener in accordance with the invention.

While the present invention may be embodied in various forms, certain preferred embodiments are shown in the drawings and are described below. However, the description of preferred embodiments is not intended to limit the scope of the invention to the disclosed embodiments. The principles of the invention may be embodied in various other forms which are not described herein.

As shown in FIG. 1, a staple fastener 10 in accordance with the invention includes two longitudinally extending leg portions 12 that are interconnected via a head or cross bar 14. Each leg portion 12 has a sharp tip 16. An extrudable filler material 18 is initially disposed between the leg portions. Typically, the staples are formed of metal, usually a metal wire, and may have various cross-sections, lengths and widths.

The extrudable filler material 18 may be any suitable material for filling a cavity 61 (FIG. 14) on the surface of a substrate 60 formed when staple fastener is driven below the surface of the substrate. When the substrate is a wood material, the filler material 18 is preferably either a crayon material, wax material, wood putty material, or other material. Typically, the filler material is colored so that the cavity is filled and the colored filler is flattened to conform to the substrate surface to render the staple location more or less invisible to the casual observer. The filler material is usually in the form of moldable, putty-like material that can be shaped under pressure to a final shape to fill a cavity completely.

Figure 2:
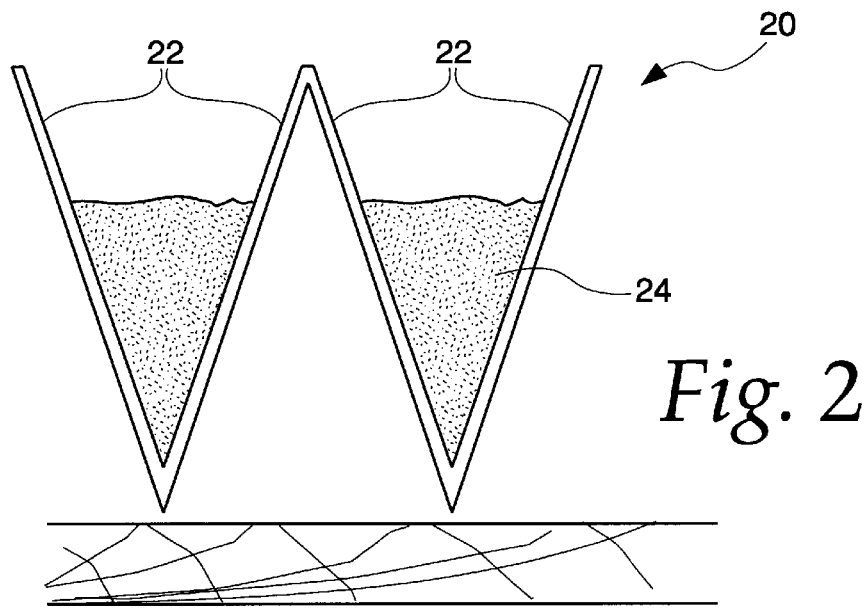
FIG. 2 is a front view of a W-shaped staple fastener in accordance with the invention.
Figure 10:
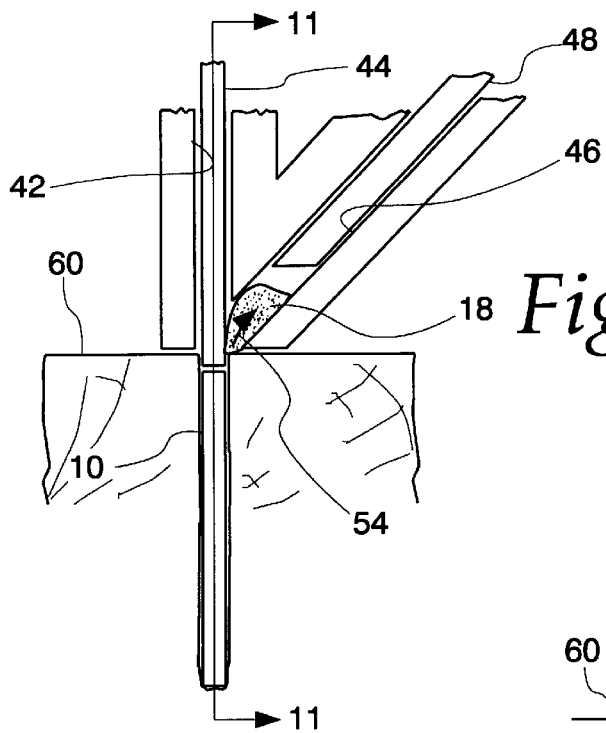
FIG. 10 is a schematic view of the staple fastener and staple gun shown in FIG. 6 wherein the staple fastener is driven completely into the substrate.
Figure 11:
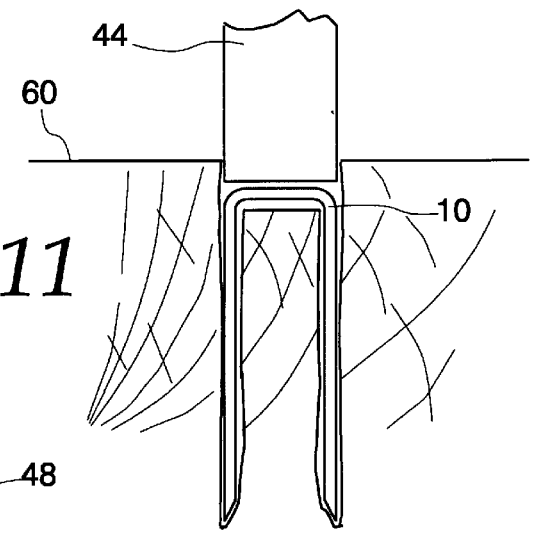
FIG. 11 is a cross-sectional view taken along the line 11—11 in FIG. 10.

An alternative embodiment of a staple fastener in accordance with the invention is shown in FIG. 2. The staple fastener 20 has leg portions 22a–22d that form a W-shaped staple. Extrudable filler material 24 is disposed between the leg portions.

Figure 3:
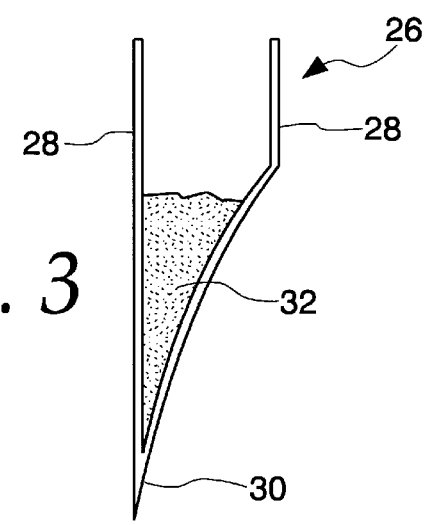
FIG. 3 is a front view of a V-shaped staple fastener in accordance with the invention.

An alternative embodiment of the staple fastener in accordance with the invention is shown in FIG. 3. The staple fastener 26 includes leg portions 28 that are connected at their distal end to form a sharp tip 30. Extrudable filler material 32 is disposed between the leg portions.

The staple fastener in accordance with the invention is driven by a staple gun mechanism, which has a primary plunger to drive the staple and a secondary plunger to tamp and smooth the filler material 18 in the cavity 61. The preferred staple gun mechanism 40 is a conventional staple gun mechanism made by one or more conventional staple or nailing gun manufacturers; and it has the usual handle, body and cartridge holder for holding the usual strip of staples. However, in the present invention, there is provided a strip 64 (FIG. 15) of staples 10, each filled with a filler material 18. The illustrated staple gun mechanism is pneumatically driven by a piston and cylinder (not shown) which are connected to a source of compressed air. It is to be understood that electrically powered staple gun mechanisms or other powered gun mechanisms may be adapted to tamp and level the filler material automatically after the staple has been first driven and the cavity 61 has been formed above the head 14 of the staple. Herein, the staple gun mechanism has been modified by adding a secondary barrel or plunger shaft 46 having an internal rectangular bore 46a in which is a secondary plunger 48 guided within the bore for reciprocating travel. The gun mechanism 40 has the conventional primary barrel or plunger shaft 42 in which a primary plunger 44 is guided for travel in a rectangular bore 42a of shaft 42. The bottom of the primary bore has an opening 40b through which the staple 10 and lower end 48a of the secondary plunger 48 are sequentially discharged. The primary plunger 44 is disposed within the primary plunger shaft 42 for vertical movement. The primary plunger 44 is part of the drive mechanism for driving staple fasteners into a substrate. As further described below and shown in FIGS. 5–13, the primary plunger shaft 42 houses a filled staple fastener which is driven by the primary plunger 44.

As shown in FIG. 4, the staple gun 40 has the secondary plunger shaft 46 oriented at an angle A relative to the vertically-oriented primary plunger shaft 42. A secondary plunger 48 is disposed for longitudinal movement within the secondary plunger shaft 46. As discussed below and shown in FIG. 13, the secondary plunger 48 moves downwardly to drive the filler material 18 into the cavity 61 and tamp the filler into cavity to fill the cavity completely and to level the top surface of the filler material level with the top surface of the substrate.

As shown in FIG. 4, the secondary plunger 48 is spring loaded with a spring 62 which retracts and maintains the secondary plunger 48 in the retracted position. A piston 50 is connected to the upper end of the secondary plunger 48. When the air pressure in the upper end 51 of the secondary plunger shaft 46 is increased, the piston 50 is depressed, thus driving the secondary plunger 48 downwardly, against the bias of spring 62. Preferably and as shown in this preferred embodiment, the increase in air pressure comes from the exhaust gas from the primary plunger shaft 42 within the gun mechanism 40.

The illustrated gun mechanism of has been modified to give the timing of the operation of the secondary plunger 48 such that the primary plunger 44 has been retracted from the cavity 61 and lifted above the packer opening 54, which opens into the primary bore 42a, preferably just above the discharge opening 40b of the primary bore 42a. The extruded filler material 18 is confined from spreading laterally by the primary plunger shaft 42 which is being pressed tightly against the substrate. A lower end 48a of the secondary plunger 48 is formed at a bias angle to the longitudinal axis of the secondary plunger shaft so as to be horizontal, as is the horizontal surface of the substrate. Stated differently, the end 48a of the stamping plunger 48 is in a plane perpendicular to the longitudinal axis of the primary shaft 42. When the end 48a is tamping the filler material 18, it will extend into the discharge opening 40b of the primary shaft 42, and will have forced any extruded filler material down out of the secondary bore 46a into the cavity and then tamps it firmly. The amount of filler material is chosen so that it fills the cavity 61 when tamped under pressure by the end 48a of the secondary plunger shaft.

Figure 13:
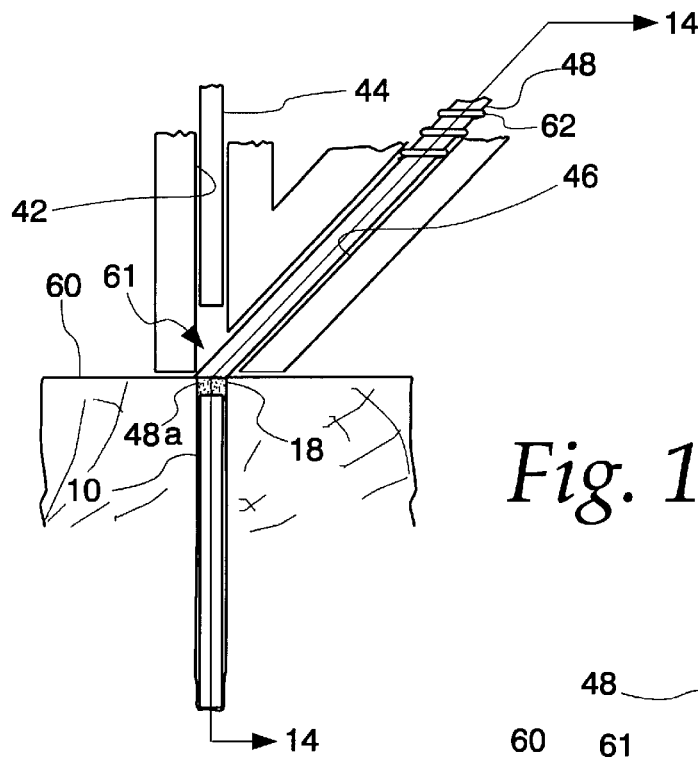
FIG. 13 is a schematic view of the staple fastener and staple gun shown in FIG. 6 wherein the primary plunger is retracted and the secondary plunger is fully extended.

Referring to FIG. 4, at the bottom of the staple gun 40, the opening 40b is a shared opening, which serves as the opening for both the primary plunger shaft 42 and the secondary plunger shaft 46. The shared shaft opening 40b communicates with a packer opening 54 for the secondary plunger shaft 46. As best seen in FIGS. 4 and 5, the rectangular wall of the primary shaft 42 facing the secondary shaft 46 has its lower end cut away to leave the rectangularly-shaped opening 54 for the secondary plunger shaft 46 to move into the bottom of the primary shaft bore 42a, as shown in FIG. 13. The packer opening 54 has a height dimension to pass the lower tip of the secondary plunger shaft 46, and this height is shown by the arrows "b" in FIG. 5. The packer opening 54 receives filler material as it is extruded from the staple fastener 10, as described below and shown in FIGS. 8 and 10.

Referring to FIG. 5, the staple fastener 10, with filler material 18 disposed between the leg portions 12, is slidably disposed within the primary plunger shaft 42.

FIGS. 6 and 7 show the primary plunger 44 in the middle of its downward stroke whereby the staple fastener 10 is partially driven into the substrate 60. As the primary plunger 44 moves downwardly within the primary plunger shaft 42, it contacts the top of the staple fastener 10, and thereby drives the staple fastener 10 downwardly into the substrate 60. During the downward stroke of the primary plunger 44, the secondary plunger 48 remains stationary in its rest position within the secondary plunger shaft 46.

As shown in FIG. 7, the inverted U-shaped staple fastener 10 initially pierces the substrate 60 with the sharp tips 16 of the leg portions 12. Initially, the filler material 18 is undisturbed.

Referring to FIGS. 8 and 9, the primary plunger 42 is shown after it has descended further in its downward stroke, and has driven the staple fastener 10 further into the substrate 60. The secondary plunger 48 is still in its rest position stationary within the material 18 to secondary plunger shaft 46. As shown in FIG. 9, the filler material 18 is contacted by substrate 60, and is extruded from between the leg portions 12 of the staple fastener 10 and upwardly into the packer opening 54 of the secondary plunger shaft 46.

When the primary plunger 44 reaches the bottom of the downward stroke within the primary plunger shaft 42 (FIGS. 10 and 11), the staple fastener 10 is driven completely into the substrate 60. The bottom portion of the primary plunger 44 is slightly below the level of the surface of substrate 60. The secondary plunger 48 remains stationary within the secondary plunger shaft 46. Most of the filler material 18 is extruded from the staple fastener 10 into the opening of the secondary shaft 46.

Figure 12:
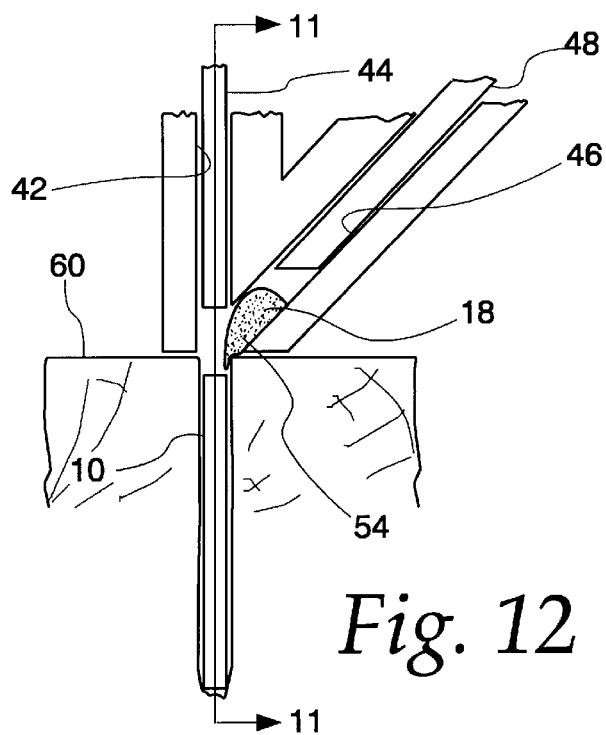
FIG. 12 is a cross-sectional view as shown in FIG. 11 wherein the primary plunger 44 is retracted.

After completing its downward stroke, the primary plunger 44 retracts, and, as shown in FIG. 12, a cavity 61 on the surface of substrate 60, above the staple fastener 10, is formed. The lower end of the primary plunger has been filling the cavity 61; and as this lower end retracts, the cavity is available to be filled by the filler material.

Figure 14:
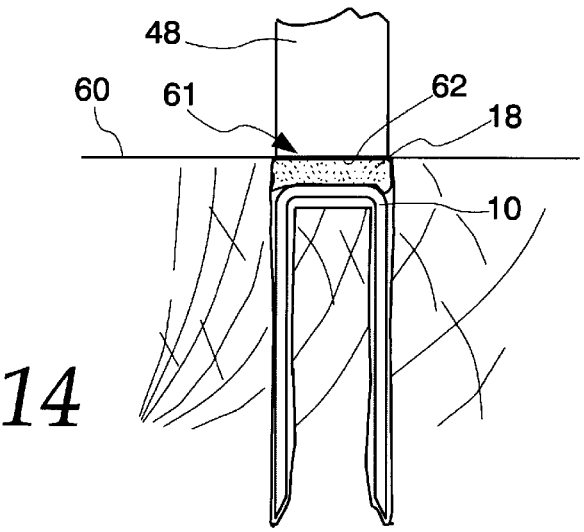
FIG. 14 is a cross-sectional view taken along the line 13—13' in FIG. 13.

After the primary plunger retracts above opening 54 in the secondary plunger shaft 46, the secondary plunger 48 is driven downwardly by exhaust gas pressure to be fully extended to the bottom of its downward stroke, as best seen in FIGS. 13 and 14. The secondary plunger 48 pushes and tamps the filler material 18 in the cavity 61. The bottom end 48a of secondary plunger 48 preferably extends across the cavity 61 so as to conform the filler material 18 have an outer surface 63 to flush with the surface of substrate 60 rendering the staple fastener location invisible.

After the secondary plunger shaft 48 completes the tamping step, it is retracted within the secondary plunger shaft 46 such as by a coiled spring 62 (FIG. 13), and the staple gun may be removed.

When using the staple 26 shown in FIG. 3, the primary plunger 44 will hit the top ends of the staple legs 28, which are vertical and parallel at their upper ends. Preferably, the straight leg 28 has a sharp pointed end which will be perpendicular to the substrate when the straight leg is impacted by a blow from the primary plunger. Because the curved leg has a lower curved portion 28a of concave shape, the wood of the substrate will squeeze this curved portion toward the straight leg forcing the filler material 32 to be displaced upwardly into the top half of the staple. As the primary shaft 44 is driven into the substrate to create the cavity 61 (FIGS. 10–12), the filler material between the staple legs 28 is extruded through the opening 54 leading into the secondary shaft 46, as best seen in FIG. 12. Then, as best seen in FIG. 13, the secondary shaft 48 is operated to displace the extruded material back through the opening 54 and into the now-empty countersink cavity 61 to leave the top surface 63 of the filler material flush with outer substrate surface 60. The W-shaped staple operates in a similar manner, as the straight legs 22a and 22d are driven straight into the substrate 60 and are disposed perpendicular to the substrate. The inner legs 22b and 22c are angled to the vertical; and the substrate wood will force these legs 22b and 22c to move toward their adjacent, associated, straight legs 22a and 22d, respectively and squeeze the filler material 24 upward as the staple 20 is driven into the substrate. Eventually, the primary shaft 44 will countersink the upper ends of the legs 22a–22d, leaving a cavity 60 to be filled with the extruded filler 24 that will have passed through opening 54 into the bottom of the bore 46 (FIG. 12). Then, when the secondary plunger 48 is operated, the filler material is pushed into and tamped into the cavity 61, leaving a surface 63 flush with the substrate surface 60.

Figure 15:
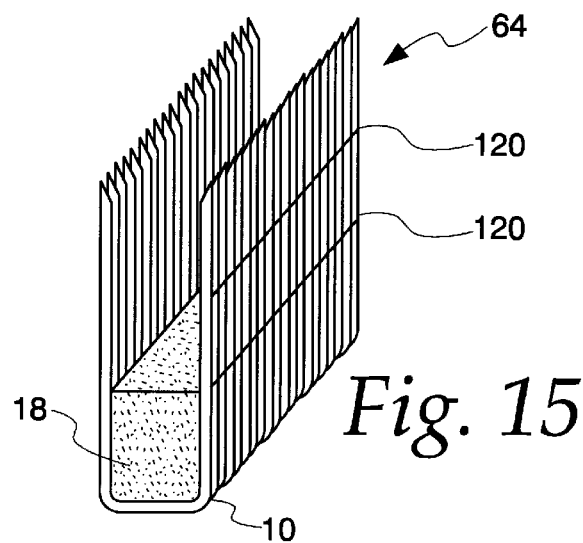
FIG. 15 is a perspective view of a staple fastener strip in accordance with the invention.

A strip 64 of staple fasteners 10 made in accordance with the invention is illustrated in FIG. 15. The staple fasteners 10 are arranged in a front-to-back relationship with adjacent fasteners 10 adhered to one another in a conventional manner used to secure together nails or the like, such as by strips 120 of a coating applied to the adjacent legs of the staples. Filler material 18 fills the strip 64. If the filler material 18 is a wood putty, or other material that dries when exposed to air, then the filler material, after it has been applied to the staple fastener strip 64, is preferably coated with an airtight sealant to prevent drying of the filler material while the strip 64 remains intact. After the staple strip 64 is placed into a staple gun and staple fasteners 10 are sheared from the strip 64 one at a time during use of the stapling gun, then, for each removed staple fastener 10, most of the filler material 18 is not covered by the sealant. The small amount of sealant on the filler material 18 in the staple fastener will not interfere with subsequent drying of the filler material.

While FIG. 15 shows a strip of U-shaped staple fasteners, the strip may be formed with staple fasteners having a variety of shapes, including those shapes disclosed above.

Further, although the invention has been described and depicted as in a preferred embodiment, it will be apparent that other variations and modifications as come within the scope of the appended claims can be considered part of the present invention without departing from the true spirit and scope of the novel concepts or principles of the invention.

What is claimed is:

1. A staple fastener comprising:

at least two longitudinally extending leg portions, said leg portions being interconnected at one end thereof, said leg portions being separated and defining a space therebetween;

an extrudable filler means for filling an indentation made in a substrate by installation of the staple, wherein said filler means at least partially fills said space between said leg portions.

2. A staple fastener in accordance with claim 1 wherein said filler material spans the distance between said leg portions.

3. A staple fastener in accordance with claim 1 wherein said staple fastener is V-shaped.

4. A staple fastener in accordance with claim 1 wherein said staple fastener is W-shaped.

5. A staple fastener in accordance with claim 1 wherein said staple is U-shaped.

6. A staple fastener in accordance with claim 1 wherein said filler material includes a colored wax material.

7. A staple fastener in accordance with claim 1 wherein said filler material includes a colored material.

8. A staple fastener in accordance with claim 1 wherein said filler material includes a colored wood putty.

9. A strip of staple fasteners comprising:

a plurality of staple fasteners, each staple fastener including at least two longitudinally extending leg portions, said leg portions being interconnected at one end thereof, said leg portions being separated and defining a space therebetween;

an extrudable filler material for filling an indentation made in a substrate by installation of the staple, wherein said filler material at least partially fills said space between said leg portions of said staple fasteners; and a material joining adjacent staple fasteners together to form the strip.

10. A strip of staple fasteners in accordance with claim 9 including a sealant material that substantially coats said filler material.

* * * * *